US009538517B2

(12) United States Patent
Baldemair et al.

(10) Patent No.: US 9,538,517 B2
(45) Date of Patent: Jan. 3, 2017

(54) USER EQUIPMENT SUPPORTING COMMUNICATION IN A MULTICARRIER RADIO COMMUNICATION SYSTEM AND A METHOD THEREIN FOR RECEIVING INFORMATION

(75) Inventors: Robert Baldemair, Solna (SE); Jung-Fu Cheng, Fremont, CA (US); Mattias Frenne, Uppsala (SE); Havish Koorapaty, Saratoga, CA (US); Daniel Larsson, Vallentuna (SE); Stefan Parkvall, Bromma (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 95 days.

(21) Appl. No.: 14/408,505

(22) PCT Filed: Jun. 27, 2012

(86) PCT No.: PCT/SE2012/050723
§ 371 (c)(1),
(2), (4) Date: Dec. 16, 2014

(87) PCT Pub. No.: WO2014/003612
PCT Pub. Date: Jan. 3, 2014

(65) Prior Publication Data
US 2015/0146640 A1 May 28, 2015

(51) Int. Cl.
*H04W 72/04* (2009.01)
*H04L 27/26* (2006.01)
*H04L 5/00* (2006.01)

(52) U.S. Cl.
CPC .......... *H04W 72/042* (2013.01); *H04L 5/0007* (2013.01); *H04L 5/0044* (2013.01);
(Continued)

(58) Field of Classification Search
CPC . H04W 72/042; H04L 27/2665; H04L 5/0007; H04L 5/0051; H04L 27/2613; H04L 27/2657; H04L 27/2666; H04L 27/2675; H04L 27/2689
(Continued)

(56) References Cited

U.S. PATENT DOCUMENTS

2007/0242599 A1 10/2007 Gorday et al.
2009/0310589 A1* 12/2009 Nangia ................ H04L 25/061
370/344
(Continued)

FOREIGN PATENT DOCUMENTS

CN 102447662 5/2012
CN 102448176 5/2012
(Continued)

OTHER PUBLICATIONS

International Search Report for International application No. PCT/SE2012/050723, Jun. 20, 2013.
(Continued)

*Primary Examiner* — Obaidul Huq
(74) *Attorney, Agent, or Firm* — Patent Portfolio Builders, PLLC

(57) ABSTRACT

A User Equipment, UE, supporting communication in a multicarrier radio communication system and a method therein for receiving information from a Radio Base Station, RBS, are provided. The method comprises determining 310 a bandwidth by which the UE will receive information, the bandwidth comprising a plurality of sub-carriers. The method also comprises adjusting 320 a bandwidth of the UE to correspond to the determined bandwidth by which the UE will receive information; and fine tuning 330 a local oscil-
(Continued)

lator of the UE such that a centre frequency of a local oscillator does not coincide with a predetermined subcarrier transmitted from the RBS.

18 Claims, 17 Drawing Sheets

(52) U.S. Cl.
CPC ........ *H04L 5/0051* (2013.01); *H04L 27/2647* (2013.01); *H04L 27/2665* (2013.01); *H04L 27/2666* (2013.01); *H04L 27/2675* (2013.01); *H04L 27/2689* (2013.01)

(58) Field of Classification Search
USPC ....... 370/310, 315, 316, 319, 320, 328, 329, 370/431, 436, 464, 465, 468, 478, 480; 455/403, 422.1, 130, 132, 141, 145, 147, 455/150.1, 179.1, 182.3, 188.1, 334, 336
See application file for complete search history.

(56) References Cited

U.S. PATENT DOCUMENTS

2012/0314790 A1* 12/2012 Stadelmeier .......... H04L 5/0092 375/267

2013/0215823 A1* 8/2013 Shin ........................ H04L 5/001 370/328

FOREIGN PATENT DOCUMENTS

| WO | WO 2010/016737 | 2/2010 |
|---|---|---|
| WO | WO 2011/136207 | 11/2011 |

OTHER PUBLICATIONS

PCT Written Opinion of the International Searching Authority for International application No. PCT/SE2012/050723, Jun. 19, 2013.
3GPP TSG RAN WG1 Meeting #67; San Francisco, USA; Title: Backwards compatible support for reduced bandwidth MTC LTE UEs (R1-114268), Nov. 14-18, 2011.
3GPP TSG-RAN WG1 #66; Athens, Greece; Title: On support of low-cost MTC terminals with reduced Tx/Rx bandwidths, Aug. 22-26, 2011.
3rd Generation Partnership Project; Technical Specification Group Radio Access Network; Study on provision on low-cost MTC UEs based on LTE; (Release 11), 2011.
Huwaei et al. "Recommendation for bandwidth reduction," 3GPP TSG RAN WG1 meeting #68bis, R1-121708, F-06921, XP050600066, Mar. 26-30, 2012, pp. 6.

* cited by examiner

▦ Subcarrier outside bandwidth of UE but within main reception bandwidth of UE

▦ Subcarrier within bandwidth of UE but outside main reception bandwidth of UE

▨ UE specific DC subcarrier

■ DMRS

▦ Subcarrier outside bandwidth of UE but within main reception bandwidth of UE

▨ UE specific DC subcarrier

■ DMRS

Subcarrier outside bandwidth of UE but within main reception bandwidth of UE

UE specific DC subcarrier

DMRS

USER EQUIPMENT SUPPORTING COMMUNICATION IN A MULTICARRIER RADIO COMMUNICATION SYSTEM AND A METHOD THEREIN FOR RECEIVING INFORMATION

PRIORITY

This nonprovisional application is a U.S. National Stage Filing under 35 U.S.C. § 371 of International Patent Application Ser. No. PCT/SE2012/050723, filed Jun. 27, 2012 and entitled "A User Equipment Supporting Communication In A Multicarrier Radio Communication System and a Method Therein For Receiving Information".

TECHNICAL FIELD

The present disclosure relates to radio communication and in particular to a user equipment supporting communication in a multicarrier radio communication system and a method therein for receiving information.

BACKGROUND

A multicarrier radio communication system supports radio communication between two nodes in the system, e.g. a user equipment, UE, and a radio base station, RBS, by providing a frequency spectrum of a plurality of subcarriers carrying communication between the two nodes.

There are different types of radio communication systems employing a multicarrier based solution for supporting communication between two nodes in the radio communication system. One example of such a type of a radio communication system is Long Term Evolution, LTE.

LTE uses Orthogonal Frequency Division Multiplex. OFDM, in the downlink and Discrete Fourier Transform, DFT, spread OFDM in the uplink. The basic LTE physical communication resources can thus be seen as a time-frequency grid, as illustrated in the example in FIG. 1a, where each resource element corresponds to one subcarrier during one OFDM symbol interval (on a particular antenna port).

In the time domain, LTE downlink transmissions are organized into radio frames of 10 ms, each radio frame including ten equally-sized subframes of 1 ms as illustrated in FIG. 1b. A subframe is divided into two slots, each of 0.5 ms time duration.

The resource allocation in LTE is described in terms of resource blocks, where a resource block corresponds to one slot (0.5 ms) in the time domain and 12 contiguous 15 kHz subcarriers in the frequency domain. Two consecutive resource blocks (in time) represent a resource block pair and correspond to the time interval upon which transmission scheduling operates. Resource blocks are numbered in the frequency domain, starting with 0 from one end of the system bandwidth.

The notion of virtual resource blocks, VRB, and physical resource blocks, PRB, has been introduced in LTE. The actual resource allocation to a UE is made in terms of VRB pairs. There are two types of resource allocations, localised and distributed. In the localised resource allocation, a VRB pair is directly mapped to a PRB pair, hence two consecutive and localised VRBs are also placed as consecutive PRBs in the frequency domain. On the other hand, the distributed VRB are not mapped to consecutive PRBs in the frequency domain, thereby providing frequency diversity for data channel transmitted using these distributed VRBs.

FIG. 2 illustrates a mapping of physical control/data channels and signals onto resource elements within a downlink subframe. In this example, the Physical Downlink Control Channels, PDCCHs, occupy the first out of three possible OFDM symbols, so in this particular case the mapping of data could start at the second OFDM symbol. Since the Cell-specific Reference Signal, CRS, is common to all UEs in the cell, the transmission of CRS cannot be easily adapted to suit the needs of a particular UE. This is in contrast to UE-specific RS (Demodulation Reference Signals, DMRS) where each UE has RS of its own placed in the data region of FIG. 2 as part of the PDSCH.

In the downlink, DL, of LTE, an unused Direct Current, DC, subcarrier in introduced. No information is mapped onto this subcarrier. For transmission bandwidths with an even number of resource blocks, the DC subcarrier is inserted between PRB N/2−1 and N/2, where N is the number of PRBs. For an odd number of PRBs, the DC subcarrier divides the PRB floor (N/2) into two halves.

Local oscillator leakage, mainly at the terminal side, may create large interference that after demodulations falls onto the DC subcarrier. Therefore, the DC subcarrier is introduced and no information is transmitted upon it.

Not all user equipments may be able to monitor the whole system bandwidth. In case a user equipment does not monitor the whole system bandwidth, but only a subset of it, such devices are limited to monitor the smaller bandwidth symmetrically around the DC subcarrier. This is due to leakage of the local oscillator of the UE, wherein the centre frequency of the local oscillator should coincide with the DC subcarrier. Such a UE typically relies on DMRS for data demodulation and Enhanced PDCCH (ePDCCH) which span only a fraction of the system bandwidth for control signalling.

SUMMARY

The object is to obviate at least some of the problems outlined above. In particular, it is an object to provide a User Equipment, UE, supporting communication in a multicarrier radio communication system and a method therein for receiving information from a Radio Base Station, RBS, wherein a bandwidth of the UE is adjusted to correspond to a determined bandwidth and a centre frequency of the bandwidth does not coincide with a predetermined subcarrier. These objects and others may be obtained by providing a UE and a method in a UE according to the independent claims attached below.

According to an aspect a method in a UE supporting communication in a multicarrier radio communication system for receiving information from an RBS is provided. The method comprises determining a bandwidth by which the UE will receive information, the bandwidth comprising a plurality of subcarriers. The method also comprises adjusting a bandwidth of the UE to correspond to the determined bandwidth by which the UE will receive information; and fine tuning a local oscillator of the UE such that a centre frequency of a local oscillator does not coincide with a predetermined subcarrier transmitted from the RBS.

According to an aspect, a UE supporting communication in a multicarrier radio communication system adapted for receiving information from an RBS is provided. The UE comprises a processing unit adapted to determine a bandwidth by which the UE will receive information, the bandwidth comprising a plurality of subcarriers, and to adjust a bandwidth of the UE to correspond to the determined bandwidth by which the UE will receive information. The UE also comprises a local oscillator adapted to position the bandwidth of the UE with regards to frequency, wherein the processing unit further is adapted to tune the local oscillator such that a centre frequency of the local oscillator does not coincide with a predetermined subcarrier transmitted from the RBS.

The method in the UE, or performed by the UE, and the UE itself have several advantages. It is ensured that a UE camping outside the centre of a system bandwidth will not receive critical information located on a centre subcarrier which is affected by the local oscillator interference. A UE not monitoring the whole system bandwidth is enabled to camp on, or monitor, a sub-bandwidth of the system bandwidth located in frequency anywhere within the whole system bandwidth. It enables scheduling flexibility and the use of less expensive receiver circuitry since a local oscillator leakage need not be suppressed.

BRIEF DESCRIPTION OF DRAWINGS

Embodiments will now be described in more detail in relation to the accompanying drawings, in which.

DETAILED DESCRIPTION

Briefly described, embodiments of a UE supporting communication in a multicarrier radio communication system and a method therein for receiving information from a RBS are provided. According to the embodiment, the UE is not required to monitor the whole system bandwidth and is further not required to monitor smaller bandwidth symmetrically around the DC subcarrier.

An exemplifying embodiment of such a method in a UE will now be described with reference to FIG. 3.

Figure 1A:
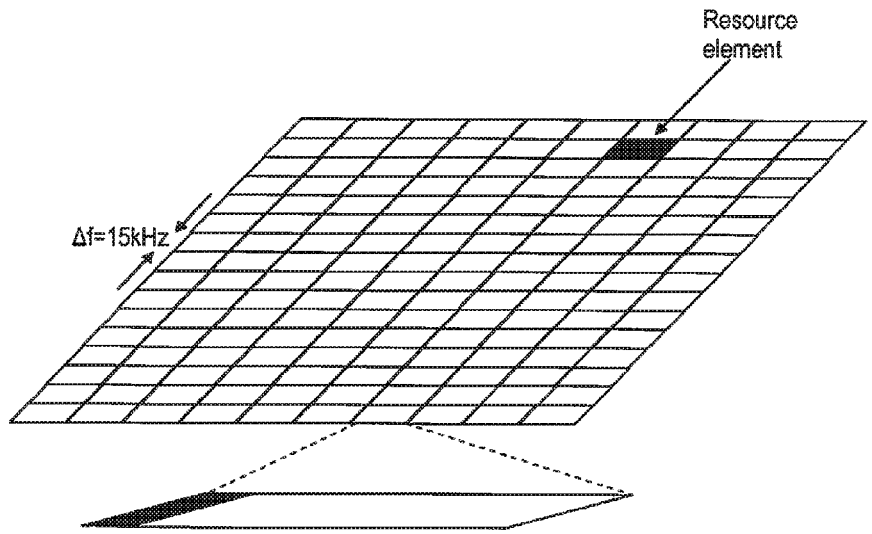
FIG. 1a is an exemplifying LTE downlink physical resource
Figure 1B:
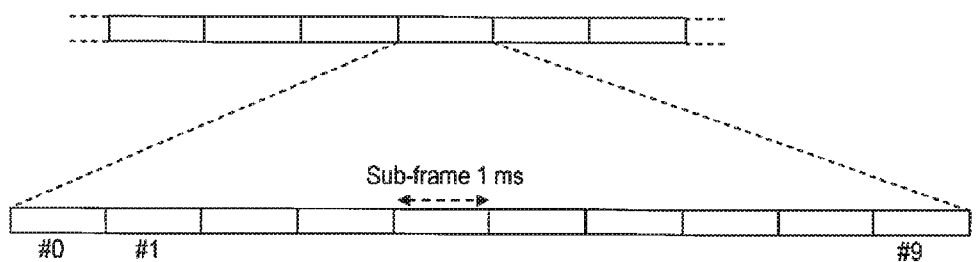
FIG. 1b illustrates the LTE time-domain structure.
Figure 2:
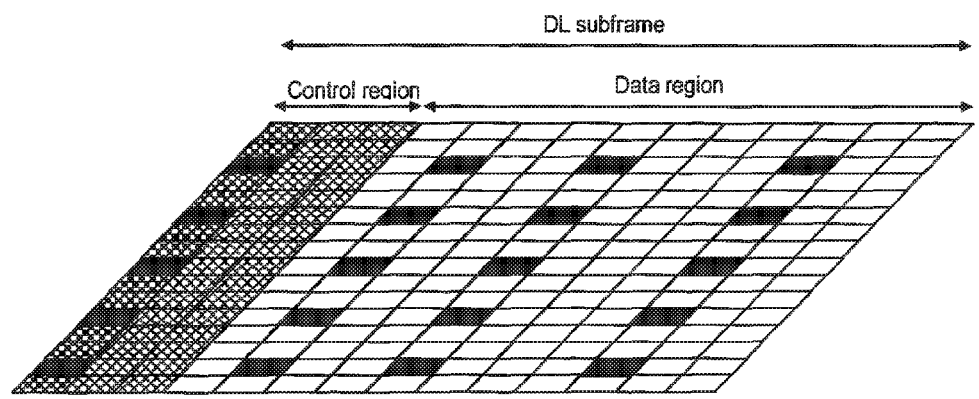
FIG. 2 illustrates mapping of LTE physical control channels, data channels and cell specific reference signals within a downlink subframe.
Figure 3:
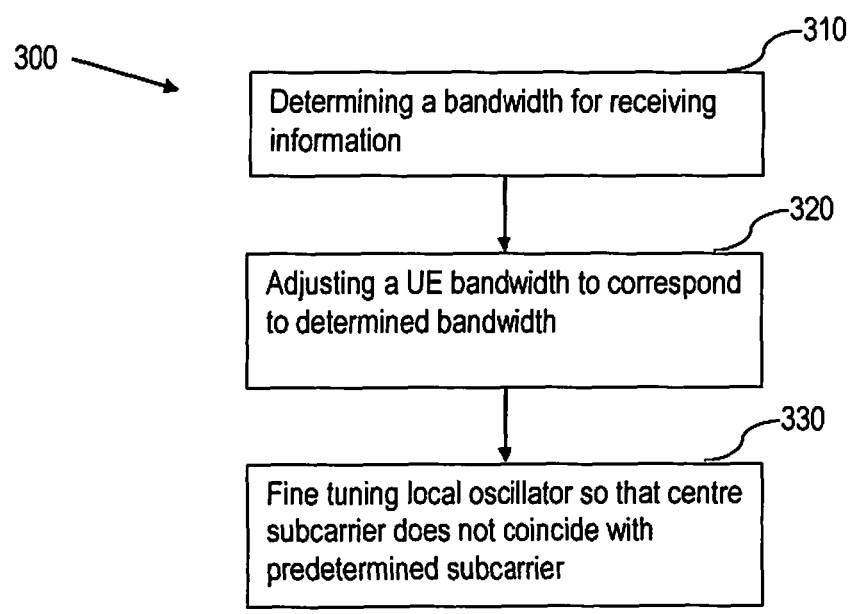
FIG. 3 is a flowchart of a method in a UE for receiving information according to an exemplifying embodiment.

FIG. 3 illustrates the method 300 in a UE, supporting communication in a multicarrier radio communication system, for receiving information from an RBS comprising determining 310 a bandwidth by which the UE will receive information, the bandwidth comprising a plurality of subcarriers. The method also comprises adjusting 320 a bandwidth of the UE to correspond to the determined bandwidth by which the UE will receive information; and fine tuning 330 a local oscillator of the UE such that a centre frequency of a local oscillator does not coincide with a predetermined subcarrier transmitted from the RBS.

When a UE connects to an RBS, the UE and the RBS exchange different kinds of information, e.g. synchronisation, transmission modes and so on. The UE determines a bandwidth by which the UE will receive information. Receiving information comprises receiving data transmission(s) from the RBS, reading or receiving reference signals, RSs, etc. The information is received on a plurality of different subcarriers. The subcarriers make up the bandwidth by which the UE will receive information. In the example of LTE, 12 contiguous 15 kHz subcarriers in the frequency domain are defined as, or make up, a PRB. Consequently, in the example of LTE, the determined bandwidth may be expressed both as a number of PRBs or a number of subcarriers.

Once the UE has determined the bandwidth by which the UE will receive information, the UE adjusts 320 a bandwidth of the UE to correspond to the determined bandwidth by which the UE will receive information.

For example, assume the system bandwidth is 100 PRBs. The UE may determine bandwidth by which the UE will receive information to be e.g. 6 PRBs, This means that the bandwidth of the UE is quite smaller than the system bandwidth and the UE adjusts its bandwidth to be 6 PRBs in this example.

Thereafter, the method comprises fine tuning 330 the local oscillator of the UE such that a centre frequency of a local oscillator does not coincide with a predetermined subcarrier transmitted from the RBS. In other words, the UE has a local oscillator, which described above may be associated with leakage such that the centre frequency of the local oscillator may create relatively large interference that after demodulations deteriorates the subcarrier corresponding to that frequency, The UE thus tunes the local oscillator such that a centre frequency of a local oscillator does not coincide with a predetermined subcarrier transmitted from the RBS. This centre frequency is hereinafter also referred to as a UE specific DC subcarrier.

The predefined subcarrier may carry information which should not be lost to the UE due to the leakage of the local oscillator as will be described below.

The method in the UE, or performed by the UE, has several advantages. It is ensured that a UE camping outside the centre of a system bandwidth will not receive critical information located on a centre subcarrier which is affected by the local oscillator interference. A UE not monitoring the whole system bandwidth is enabled to camp on, or monitor, a sub-bandwidth of the system bandwidth located in frequency anywhere within the whole system bandwidth. It enables scheduling flexibility and the use of less expensive receiver circuitry since a local oscillator leakage need not be suppressed.

According to an embodiment, the predefined subcarrier comprises a Demodulation Reference Signal, DMRS.

DMRSs are sent on several, but not all, subcarriers within a PRB. The DMRSs are very important for demodulation purposes and it should be ensured that a subcarrier coinciding with the centre frequency of the local oscillator, the UE specific DC subcarrier, never contains DMRSs. In other words, it should be ensured that the DMRSs are never punctured and never transmitted on the subcarrier coinciding with the UE specific DC subcarrier.

However, information not targeting the UE, or not specifically intended for the UE, such as e.g. Cell-specific Reference Signals, CRSs may be transmitted.

This is ensured by the UE fine tuning its local oscillator such that the centre frequency thereof, i.e. the UE specific DC subcarrier, does not coincide with a predetermined subcarrier transmitted from the RBS, i.e. a subcarrier comprising a DMRS.

According to an embodiment, the predefined subcarrier comprises a Physical Downlink Shared Channel, PDSCH.

Since the UE may likely not be able to receive information on the subcarrier coinciding with the UE specific DC subcarrier, it should be ensured that no PDSCH is sent on that subcarrier.

However, information not targeting the UE, or not specifically intended for the UE, such as e.g. Cell-specific Reference Signals, CRSs may be transmitted. Another example of information that may be transmitted is information targeting another UE, e.g. the same resource block is scheduled in Multi User Multiple Input Multiple Output, MU-MIMO, fashion for the UE in question and another UE.

This is ensured by the UE fine tuning its local oscillator such that the centre frequency thereof, i.e. the UE specific DC subcarrier, does not coincide with a predetermined subcarrier transmitted from the RBS, i.e. a subcarrier comprising a PDSCH.

According to still an embodiment, determining the bandwidth by which the UE will receive information comprises receiving information from the RBS indicating the bandwidth.

The RBS instructs, in one example, the UE to use a specific bandwidth by which the UE will receive information. In this manner, the RBS is enabled to spread out a plurality of UEs not needing to, or not being able to, monitor the whole system bandwidth all over the system bandwidth. The RBS sends information, e.g. by a signalling message, to the UE indicating the bandwidth by which the UE will receive information. In this manner, the UE determined the bandwidth in question. The UE may also determine the bandwidth by receiving RRC signalling.

In an example, the UE is physically restricted by means of its components to only monitor a limited amount or PRB or subcarriers. Examples of such UEs are so called low-cost devices, low-data-rate devices and narrowband devices. In this example, the UE determines the bandwidth that it is capable of monitoring and may additionally receive information from the RBS where in the system bandwidth, with regards to frequency, the UE should receive information.

According to still an embodiment, determining 110 a bandwidth by which the UE will receive information comprises determining the number of subcarriers of the bandwidth and/or a location of the subcarriers with regard to frequency within a system bandwidth.

Assuming again that the system bandwidth is 100 PRBs and each PRB comprises 12 subcarriers, then determining the bandwidth by which the UE will receive information comprises in one example determining the number of subcarriers, or the number of PRBs of that bandwidth, being a sub-bandwidth of the system bandwidth. E.g. the bandwidth is determined to be 6, 15 or 63 PRBs out of the 100 constituting the system bandwidth. In a further example, determining the bandwidth by which the UE will receive information comprises alternatively or additionally to determine or the location of the subcarriers with regard to frequency within a system bandwidth. Again as an example, with the 100 PRBs, the PRBs are numbered 0-99 and determining the bandwidth by which the UE will receive information comprises determining to monitor PRBs 8, 9, 10, 11 and 12; or PRBs 23, 24, 25, 26, 27 and 28. The number of PRBs may be odd or even.

As explained above, once the number of subcarriers (or PRBs) comprised in the bandwidth, i.e. a sub-bandwidth of the system bandwidth, by which the UE will receive information is determined and where, with regard to frequency, said subcarriers are located within the system bandwidth, the UE adjusts a bandwidth of the UE to correspond to the determined bandwidth by which the UE will receive information, i.e. the number of subcarriers. Then the UE fine tuning 330 the local oscillator of the UE such that a centre frequency of a local oscillator does not coincide with a predetermined subcarrier transmitted from the RBS to make sure that the UE specific DC does not coincide with a subcarrier carrying DMRS(s) or alternatively PDSCH.

The UE comprises in an example at least one filter, which determines the bandwidth of the UE. The filter or filters are adjustable by selecting different filter parameters. In this example, adjusting the bandwidth of the UE to correspond to the determined bandwidth by which the UE will receive information comprises selecting at least one filter parameter associated with at least one filter in the UE, whereby the bandwidth of the UE is adjusted according to the selected parameter(s).

According to an embodiment, information indicating which subcarrier is the predetermined subcarrier is signalled from the RBS.

In this embodiment, the UE is informed which subcarrier in the bandwidth by which the UE will receive information, is the predetermined subcarrier so that the UE will know which subcarrier should not coincide with the UE specific DC subcarrier, or the centre frequency of a local oscillator. The signalling may be performed by RRC signalling, MAC signalling, L1/2 control signalling comprising information of the transmission of the predetermined subcarrier. It shall be pointed out that any subcarrier carrying DMRS(s) in one example and PDSCH in another example constitute the predetermined subcarrier.

According to yet an embodiment, information indicating which subcarrier is the predetermined subcarrier is determined by the UE.

This may be accomplished e.g. during the time when the UE connects to the RBS, the RBS configures the UE or the RBS schedules the UE and they exchange different kinds of information. During this connection procedure, the UE obtains, in an example, information regarding the transmission of DMRS(s), Cell-specific Reference Signals. The UE stores this information and uses it to determine which subcarrier is the predetermined subcarrier that should not coincide with the centre frequency of the local oscillator of the UE.

According to still an embodiment, wherein if the centre frequency of the local oscillator coincides with the predetermined subcarrier, then the method comprises selecting at least one filter parameter to expand the bandwidth of the UE to include at least a portion of at least one additional subcarrier and tuning the local oscillator to shift the centre frequency of the oscillator towards an edge of the bandwidth in order for the centre frequency of the oscillator not coinciding with the predetermined subcarrier.

The UE determines the centre frequency of its local oscillator, which frequency corresponds to the UE specific DC subcarrier. The UE also checks if the UE specific DC subcarrier coincides with the predetermined subcarrier. If this is the case, the UE should prevent this from happening. The UE thus selects at least one filter parameter to expand the bandwidth of the UE to include at least a portion of at least one additional subcarrier. It shall be pointed out that the UE may select a parameter to expand the bandwidth of the UE to include a plurality of subcarriers. Further, the bandwidth may be expanded at one edge of the bandwidth or at both edges of the bandwidth. Then the UE tunes the local oscillator to shift the centre frequency of the oscillator towards an edge of the bandwidth in order for the centre frequency of the oscillator not coinciding with the predetermined subcarrier.

As described above, the UE may comprise at least one filter, which determines the bandwidth of the UE. The filter or filters are adjustable by selecting different filter parameters. In order to expand the bandwidth, the UE selects at least one filter parameter associated with at least one filter in the UE in order to expand the bandwidth to include at least a portion of at least one additional subcarrier.

The UE additionally tunes the local oscillator in order to shift the UE specific DC subcarrier away from the predetermined subcarrier towards either the lower edge or the higher edge, frequency wise, of the bandwidth of the UE. As described above, there may be more than one predefined subcarrier and in one example the predetermined subcarrier comprises DMRS and in another example, the predetermined subcarrier comprises PDSCH. Depending on where in frequency the UE specific DC subcarrier is located and where in frequency the predetermined subcarriers are located, the UE specific DC subcarrier may be shifted to a subcarrier with higher or lower frequency. Further, the UE specific DC subcarrier may be shifted further than just to an adjacent subcarrier in order to not coincide with the, or any, predetermined subcarrier.

According to yet an embodiment, wherein if the centre frequency of the local oscillator coincides with the predetermined subcarrier, then the method comprises selecting at least one filter parameter to reduce the bandwidth of the UE to exclude at least a portion of at least one additional subcarrier and tuning the local oscillator to shift the centre frequency of the oscillator towards an edge of the bandwidth in order for the centre frequency of the oscillator not coinciding with the predetermined subcarrier.

The UE determines the centre frequency of its local oscillator, which frequency corresponds to the UE specific DC subcarrier. The UE also checks if the UE specific DC subcarrier coincides with the predetermined subcarrier. If this is the case, the UE should prevent this from happening. The UE thus selects at least one filter parameter to reduce the bandwidth of the UE to exclude at least a portion of at least one additional subcarrier. It shall be pointed out that the UE may select a parameter to reduce the bandwidth of the UE to exclude a plurality of subcarriers. Further, the bandwidth may be reduced at one edge of the bandwidth or at both edges of the bandwidth. Then the UE tunes the local oscillator to shift the centre frequency of the oscillator towards an edge of the bandwidth in order for the centre frequency of the oscillator not coinciding with the predetermined subcarrier.

Reducing the bandwidth is performed in a similar manner as expanding with, with regards to selecting at least one filter parameter to adjust the bandwidth.

According to an embodiment, the multicarrier radio communication system is an Orthogonal Frequency Division Multiplex, OFDM, based system.

One example of a multicarrier radio communication system employing OFDM is LTE, which has been exemplified above.

Figure 4:
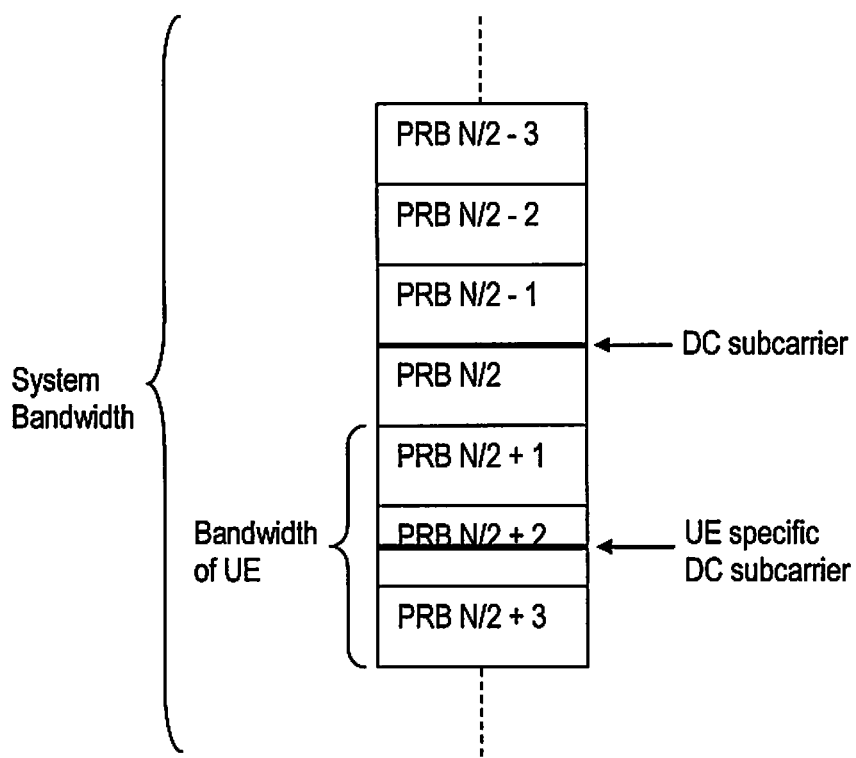
FIG. 4 illustrates an example of the location with regards to frequency of a UE specific DC subcarrier.

FIG. 4 illustrates an example of the location with regards to frequency of a UE specific DC subcarrier. In this example the system bandwidth comprises N number of PRBs. In this example, N is an even number and the bandwidth of the UE is 3 PRBs and located in frequency to comprise PRBs N/2+3, N/2+2 and N/2+1. The DC subcarrier of the system bandwidth where the RBS will not transmit any information is located between PRBs N/2−1 and N/2. FIG. 4 also illustrates the UE specific subcarrier being located in the middle of the bandwidth of the UE which is in the middle of PRB N/2+2.

It shall be pointed out that in case a PRB comprises an even number of subcarriers, e.g. in LTE 12 subcarriers, then there will not be one subcarrier located exactly in the middle of the bandwidth of the UE. Rather, there will be two subcarriers which are located in the middle of the bandwidth of the UE. In case none of those two is the predetermined subcarrier, the UE may tune the local oscillator such that the centre frequency of the oscillator, i.e. the UE specific DC subcarrier coincides with either one of those two subcarriers in the middle.

In an example when the predetermined subcarrier comprises DMRS and the UE fine tunes the local oscillator of the UE such that the centre frequency of the local oscillator does not coincide with the predetermined subcarrier transmitted from the RBS, the centre frequency of the oscillator may coincide with a subcarrier comprising PDSCH. If this is the case, the RBS may consider, during link adaptation, that the UE will not be able to fully use the information contained on the subcarrier coinciding with the centre frequency of the local oscillator. In an extreme case, the UE will just ignore the information of this subcarrier.

Figure 5:
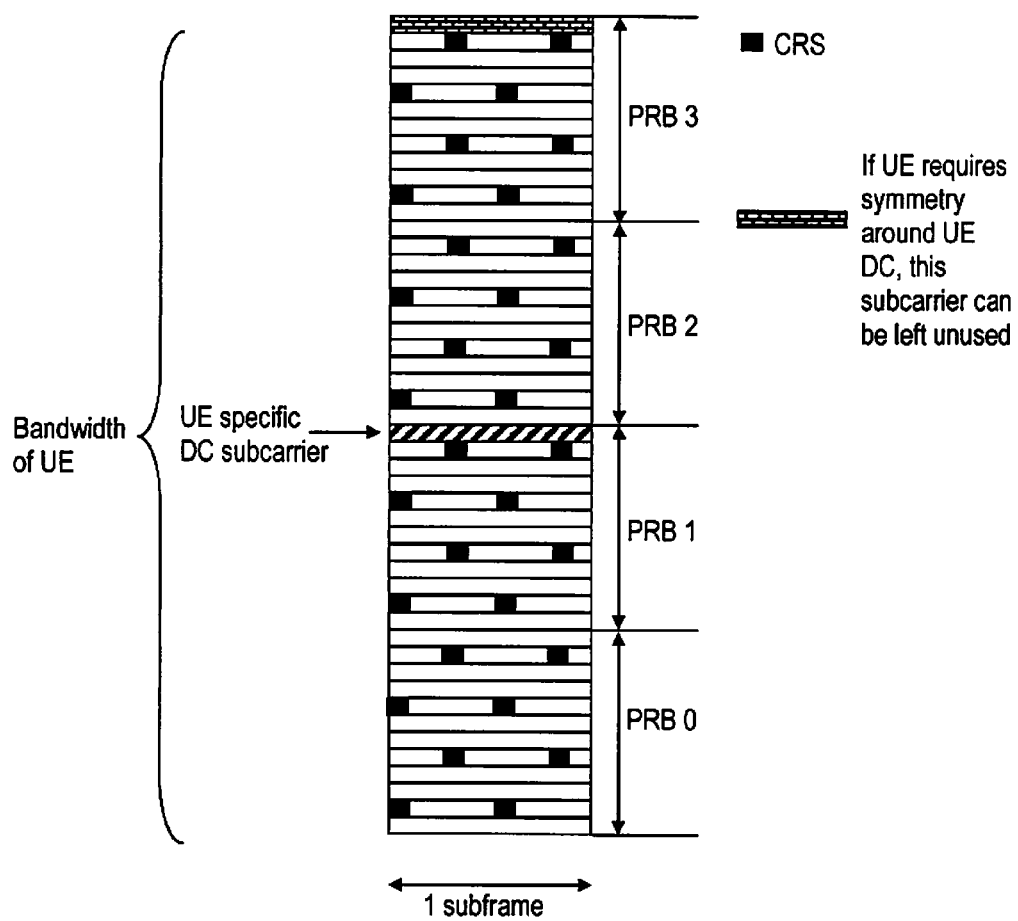
FIG. 5 illustrates an example of the bandwidth of the UE comprising an even number of PRBs.

In an example, the bandwidth of the UE comprises an even number of PRBs, this is illustrated in FIG. 5. In FIG. 5, each PRB comprises 12 subcarriers so that there is not one single subcarrier at the centre of the bandwidth of the UE. In this example, the UE specific DC subcarrier is placed, by fine tuning the local oscillator, at the edge subcarrier of one of the two PRBs in the centre of the bandwidth of the UE. FIG. 5 also illustrates that it may be the case that the UE requires symmetry around the UE specific DC subcarrier, wherein the top subcarrier in PRB 3 is ignored by the UE. In this manner, the UE specific subcarrier becomes located, frequency wise, in the middle of the bandwidth of the UE.

Figure 6:
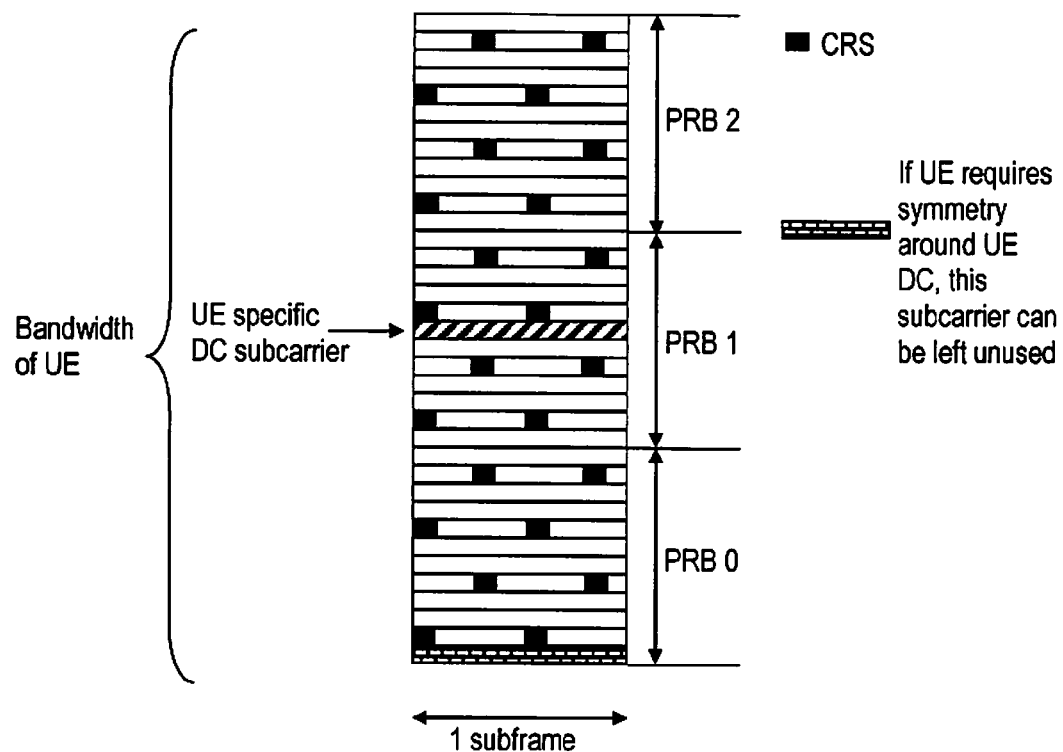
FIG. 6 illustrates an example of the bandwidth of the UE comprising an odd number of PRBs.

In an example, the bandwidth of the UE comprises an odd number of PRBs, this is illustrated in FIG. 6. In FIG. 6, each PRB comprises 12 subcarriers so that there is not one single subcarrier at the centre of the bandwidth of the UE. In this example, the UE specific DC subcarrier is placed, by fine tuning the local oscillator, at the centre subcarrier of the centre PRB (PRB 1) in the centre of the bandwidth of the UE. FIG. 6 also illustrates that it may be the case that the UE requires symmetry around the UE specific DC subcarrier, wherein the bottom subcarrier in PRB 0 is ignored by the UE. In this manner, the UE specific subcarrier becomes located, frequency wise, in the middle of the bandwidth of the UE.

In both example above illustrated in FIGS. 5 and 6, the UE specific DC subcarrier is not exactly in the middle of the allocated subcarriers since the number of subcarriers allocated to a UE is always even (a resource block has an even number of subcarriers). If it is required that the DC subcarriers is exactly in the middle of the UE bandwidth (since local oscillator interference occurs exactly in the centre of the received bandwidth and the UE specific DC subcarrier should be there) the outermost subcarrier could be left unallocated, i.e. no information targeting the UE is transmitted. The UE could in this case use a main reception bandwidth slightly narrower than the allocated PRBs. If PDSCH is anyway transmitted on these subcarriers but the UE uses a slightly narrower filter a more robust modulation and coding scheme could be used during link adaptation compensating for this lost/less usable subcarrier. Alternatively, the UE simply ignores the information transmitted on that outermost subcarrier.

Link adaptation is the process in which the scheduler determines the resources upon which the UE will be scheduled and also the modulation and coding format. If the scheduler is aware that the UE will not be able to use all information transmitted on all subcarriers it may use a more robust modulation and coding scheme to compensate for this loss. FIGS. 5 and 6 are examples of reducing the bandwidth of the UE as has also been explained above.

Alternatively, instead of the RBS leaving a subcarrier unallocated, or the UE ignoring the subcarrier, i.e. reducing the bandwidth of the UE, the UE could expand its receiver bandwidth to receive an extra subcarrier on at least one band edge as described above. Also in this case the UE specific DC subcarrier becomes centred with regards to frequency.

In another example, the UE receives signalling from the RBS indicating a subcarrier in the bandwidth of the UE which shall be the UE specific DC subcarrier. The UE then tunes the local oscillator so that the centre frequency of the local oscillator corresponds to the UE specific DC subcarrier. In this manner, the RBS controls the UE so that the RBS has control of where the UE specific DC subcarrier is placed in frequency and may thereafter schedule e.g. PDSCH in order to avoid the UE specific DC subcarrier.

In another example, the UE may determine the UE specific DC subcarrier based on a rule. If the number of PRBs in the bandwidth of the UE is denoted N and are labelled from 0 to N−1, one exemplifying rule is:
N is even: PRB=N/2−1, subcarrier is L−1,
N is odd: PRB=floor (N/2), subcarrier=L/2,
where L is the number of subcarriers per PRB. In LTE there
  are L=12 subcarriers per PRB. Subcarriers are labelled 0 to L−1 within a PRB.
  Another exemplifying rule is:
N is even: PRB=N/2, subcarrier is 0,
N is odd: PRB=floor (N/2), subcarrier=L/2.
  Yet another exemplifying rule is:
N is even: PRB=N/2−1, subcarrier is L−1,
N is odd: PRB=floor (N/2), subcarrier=L/2−1.
  Yet another exemplifying rule is:
N is even: PRB=N/2, subcarrier is 0,
N is odd: PRB=floor (N/2), subcarrier=U2−1.

Figure 7:
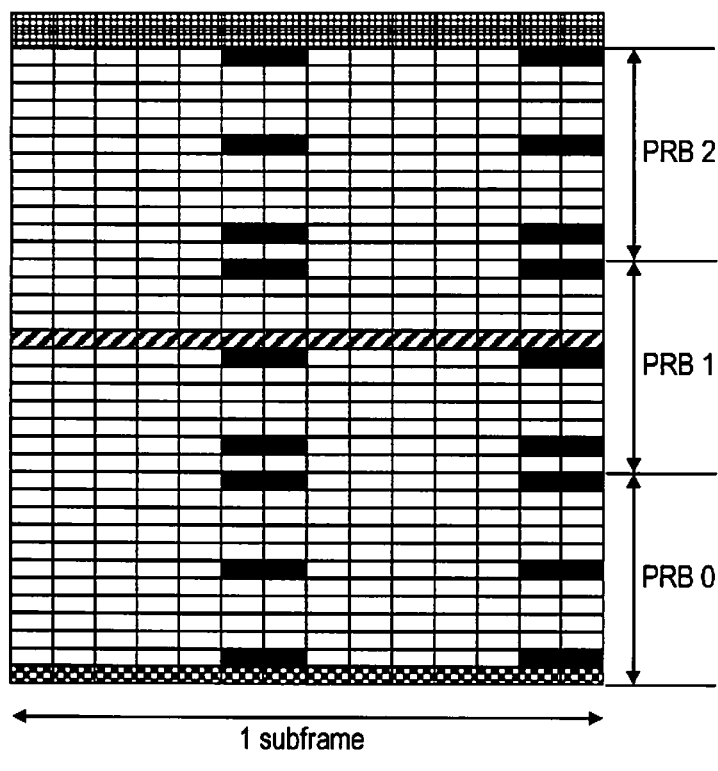
FIG. 7 illustrates an example of the position of the UE specific DC subcarrier within the bandwidth of the UE comprising an odd number of PRBs.

FIG. 7 illustrates an example of the position of the UE specific DC subcarrier within the bandwidth of the UE comprising an odd number of PRBs. In FIG. 7, the DMRSs are shown for antenna port 7, 8, 11 and 13 in LTE. If more than dual-layer transmission should be supported then three and more layers require one more antenna ports out of the set {9, 10, 12, 14} for the UE.

To ensure that the UE specific DC subcarrier coincides with the centre of the bandwidth of the UE, or the received bandwidth, the outermost subcarrier of the lowest PRB is outside the main reception bandwidth i.e. the UE receiver filter starts to filter out this subcarrier. In other words, the bandwidth is reduced to exclude this subcarrier at this edge of the bandwidth of the UE. Since the bandwidth of the UE is symmetric around the UE specific DC subcarrier (to be exact the bandwidth of the UE is symmetric around the subcarrier which is hit by local oscillator interference and this subcarrier should overlap with the UE specific DC subcarrier) two extra subcarriers are within the receiver bandwidth on the opposite band edge. In other words, the bandwidth of the UE is expanded on this opposite edge of the bandwidth to include two more subcarriers. This example illustrates that the bandwidth of the UE may be reduced at one edge of the bandwidth and expanded at the opposite edge of the bandwidth in order to shift the UE specific DC subcarrier away from the predetermined subcarrier.

The information transmitted on the extra included subcarriers is typically not intended for the UE. The subcarrier that is not received in the lowest PRB (PRB 0) can either be left empty or the RBS transmits information on it but the UE cannot utilize this information to its full extend. In the latter case the RBS could use a more robust modulation and coding scheme that considers that the UE may not be able to receive the lowest subcarrier.

The UE has a bandwidth allocation corresponding to an odd number of PRBs (3 in this example). The UE specific DC subcarrier is introduced in the middle PRB (PRB 1). The bottom patterned subcarrier is outside the main reception bandwidth of the receive filter, but within the bandwidth scheduled to the UE. Since the UE receiver bandwidth is symmetric around the UE specific DC subcarrier the top two patterned subcarriers are within the main reception bandwidth of the UE, even though these subcarriers are probably intended for another UE. Only PRBs of the UE are shown. Only DMRS for antenna ports {7, 8, 11, 13} are shown.

Alternatively, instead of excluding the lowest subcarrier as in FIG. 7, the UE can implement a slightly wider receive filter to include this subcarrier as well as an extra subcarrier at the other band edge that is within the extended receiver bandwidth. This extra subcarrier is typically indented for another UE. See FIG. 8.

Figure 8:
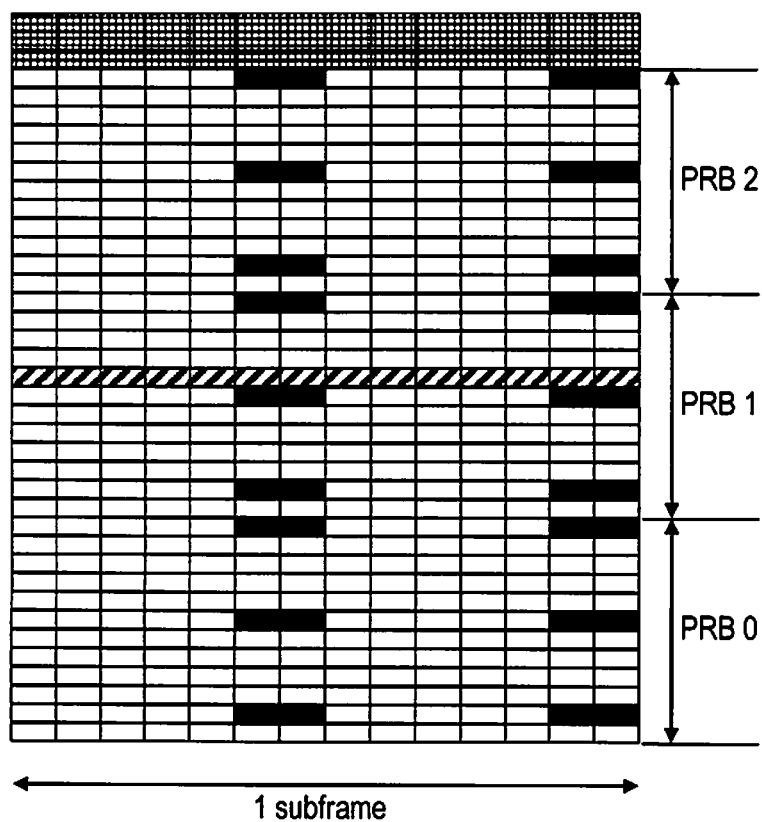
FIG. 8 illustrates another example of the position of the UE specific DC subcarrier within the bandwidth of the UE comprising an odd number of PRBs.

FIG. 8 illustrates another example of the position of the UE specific DC subcarrier within the bandwidth of the UE comprising an odd number of PRBs.

The UE has a bandwidth allocation corresponding to an odd number of PRBs (3 in this example). The UE specific DC subcarrier is introduced in the middle PRB. All subcarriers allocated to the UE are received. Since the UE receiver bandwidth is symmetric around the UE specific DC subcarrier, also the top three patterned subcarriers are within the main reception bandwidth of the UE, even though these subcarriers are probably intended for another UE. Only PRBs of the UE are shown. Only DMRS for antenna ports {7, 8, 11, 13} are shown.

Figure 9:
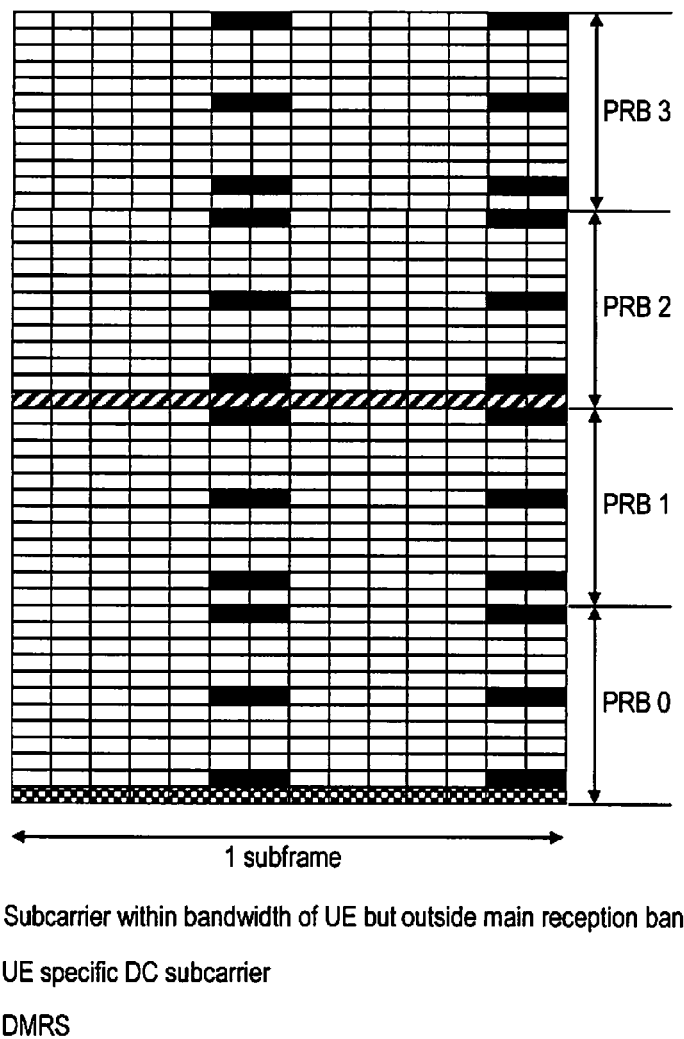
FIG. 9 illustrates an example of the position of the UE specific DC subcarrier within the bandwidth of the UE comprising an even number of PRBs.

FIG. 9 illustrates an example of the position of the UE specific DC subcarrier within the bandwidth of the UE comprising an even number of PRBs.

The UE has a bandwidth allocation corresponding to an even number of PRBs (4 in this example). The bottom patterned subcarrier is outside the main reception bandwidth of the receive filter. Only PRBs of the UE are shown. Only DMRS for antenna ports {7, 8, 11, 13} are shown. In this example, the bandwidth of the UE has been reduced at the lower edge of the bandwidth to exclude the bottom subcarrier in order to position the UE specific DC subcarrier symmetrically in the centre of the bandwidth of the UE.

Figure 10:
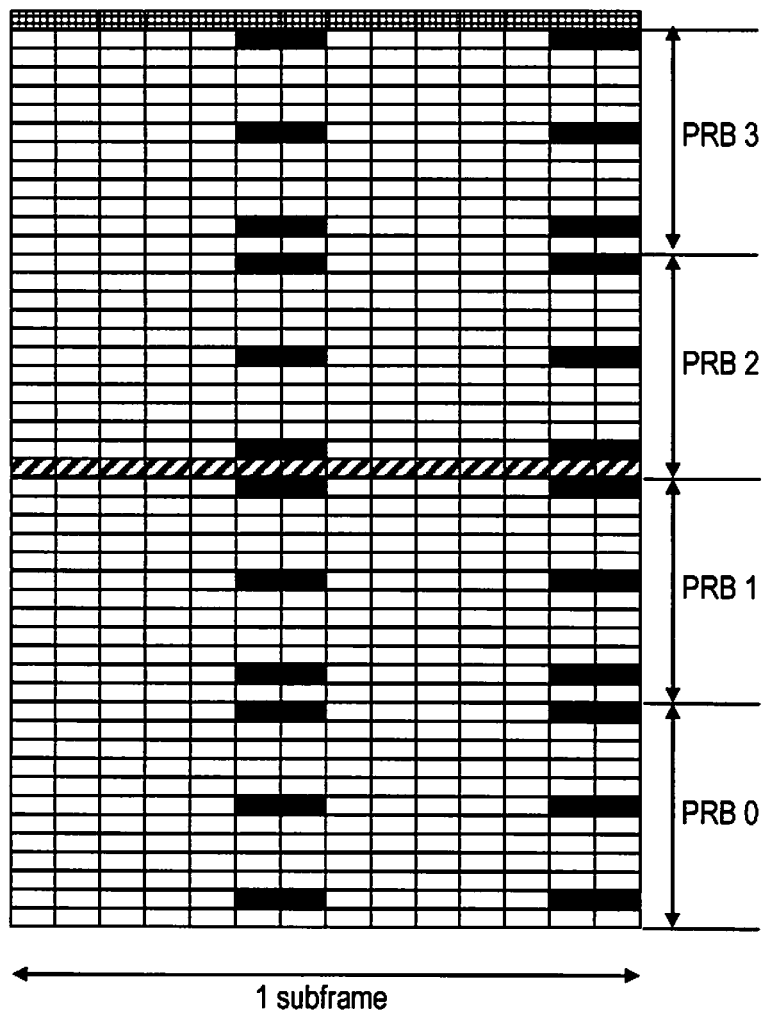
FIG. 10 illustrates another example of the position of the UE specific DC subcarrier within the bandwidth of the UE comprising an even number of PRBs.

FIG. 10 illustrates another example of the position of the UE specific DC subcarrier within the bandwidth of the UE comprising an even number of PRBs. In this example, the bandwidth of the UE is slightly increased to include one additional subcarrier at the upper band edge.

The UE has a bandwidth allocation corresponding to an even number of PRBs (4 in this example). All subcarriers allocated to the UE are received. Since the UE receiver bandwidth is symmetric around the UE specific DC subcarrier also the top patterned subcarrier is within the main reception bandwidth of the UE, even though that subcarrier probably is intended for another UE. Only PRBs of the UE are shown. Only DMRS for antenna ports {7, 8, 11, 13} are shown.

If one or more antenna ports out of the set {9, 10, 12, 14} are used (even though in $3^{rd}$ Generation Partnership Project, 3GPP, Release-10 these antenna ports are only needed for transmissions with three and more layers) the DMRS are placed at different subcarriers and thus also the UE specific DC subcarrier.

Figure 11:
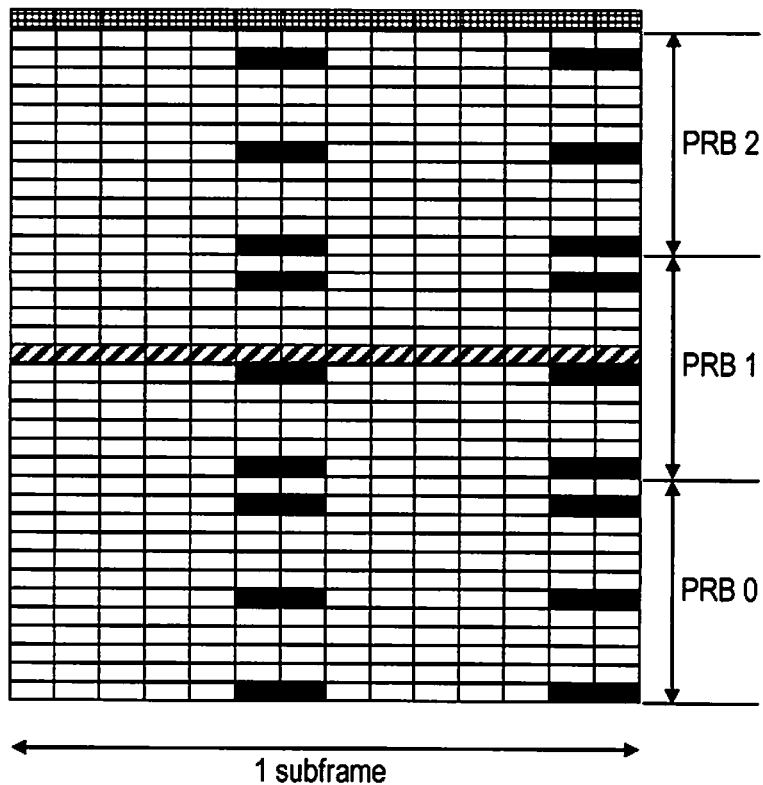
FIG. 11 illustrates an example of the position of the UE specific DC subcarrier within the bandwidth of the UE comprising an odd number of PRBs.

FIG. 11 illustrates an example of the position of the UE specific DC subcarrier within the bandwidth of the UE comprising an odd number of PRBs. In this example, the receiver main reception bandwidth, i.e. the bandwidth of the UE, is slightly larger than the allocated PRBs. All subcarriers within the allocated PRBs as well as an extra subcarrier are within the main reception bandwidth.

The UE has a bandwidth allocation corresponding to an odd number of PRBs (3 in this example). The UE specific DC subcarrier is introduced in the middle PRB. All subcarriers allocated to the UE are received, i.e. the UE does not reduce the bandwidth at any of the edges of the bandwidth. Since the UE receiver bandwidth is symmetric around the UE specific DC subcarrier also the top patterned subcarrier is within the main reception bandwidth of the UE, even though this subcarrier is probably intended for another UE. In other words, the UE has selected at least one filter parameter to expand the bandwidth of the UE to include one additional subcarrier at the upper edge of the UE bandwidth. Only PRBs of the UE are shown. Only DMRS for antenna ports {9, 10, 12, 14} are shown.

Figure 12:
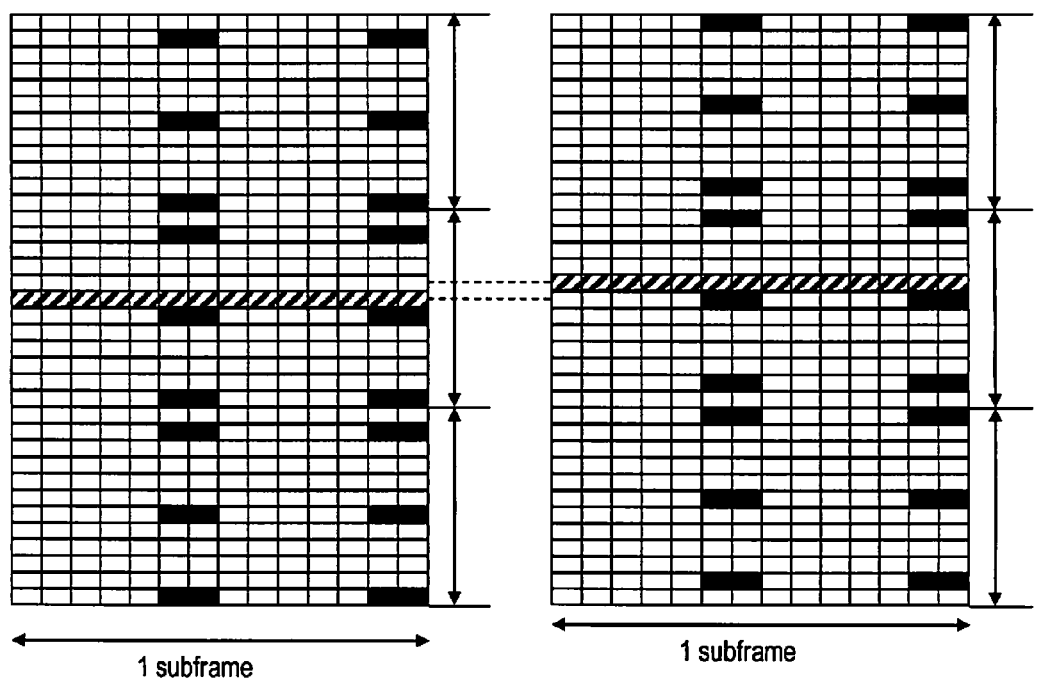
FIG. 12 illustrates an example of comparing the position of two alternative options for the placement of the UE specific DC subcarrier.

FIG. 12 illustrates an example of comparing the position of two alternative options for the placement of the UE specific DC subcarrier. The position of the UE specific DC subcarrier is compared for the same odd PRB allocation for DMRS corresponding to any of antenna ports {7, 8, 11, 13} and with DMRS corresponding to antenna ports {9, 10, 12, 14}. It can be seen that the position changes. Which DMRS antenna ports should be used could be a scheduling decision. The subcarrier that is hit by local oscillator interference in the UE (and the UE specific DC subcarrier that does not contain any DMRS should fall on top of it) is given by the centre bandwidth of the receiver of the UE and should therefore not dynamically be changed (so-called Radio Frequency, RF, retuning)

The UE has a bandwidth allocation corresponding to an odd number of PRBs (3 in this example). In the right side the UE is scheduled with an antenna port (and thus uses DMRS) out of the set {7, 8, 11, 13}. In the left side the UE is scheduled with an antenna port (and thus uses DMRS) out of the set {9, 10, 12, 14}. The frequency position of the UE specific DC subcarrier changes.

However, if the DMRS antenna ports dynamically change through scheduling also the DMRS-free UE specific DC subcarrier changes which would require the UE to dynamically tune the centre frequency of the local oscillator to ensure the subcarrier hit by local oscillator interference follows the UE specific DC subcarrier. Since this behaviour is not desirable, the DMRS antenna ports used to schedule the UE should not vary across sets, i.e. a UE should either use DMRS out of set {7, 8, 11, 13} or {9, 10, 12, 14}. On a slower basis it is of course possible to change the set of DMRS antenna ports used for a UE, e.g. via RRC signalling. It could also be that the set of DMRS antenna ports is fixed or depends on the frequency position the UE camps at.

Figure 13:
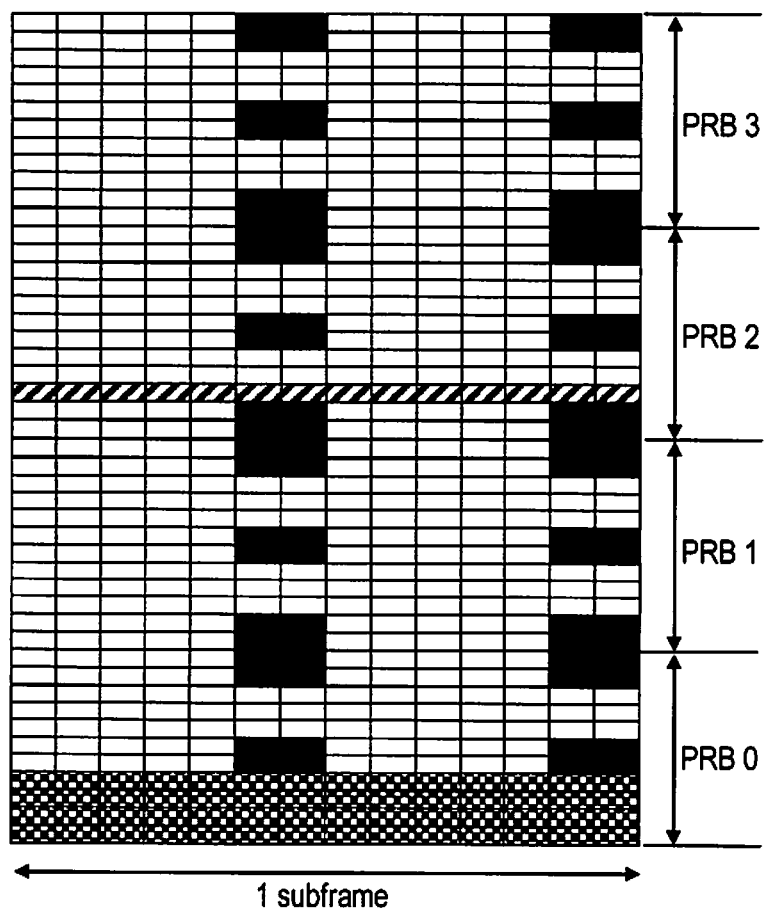
FIG. 13 illustrates another example of the position of the UE specific DC subcarrier within the bandwidth of the UE comprising an even number of PRBs.

FIG. 13 illustrates another example of the position of the UE specific DC subcarrier within the bandwidth of the UE comprising an even number of PRBs. The location of the UE specific DC subcarrier results in a main reception bandwidth slightly narrower than the number of allocated PRB, since in order to make sure that the UE receiver bandwidth is symmetric around the UE specific DC subcarrier, the bandwidth of the UE is reduced to exclude the four patterned subcarriers as the lower edge of the bandwidth. It can be seen in FIG. 13 that it is not possible to have the UE specific DC subcarrier located in the centre of the "original" bandwidth, i.e. the four PRBs. This is because the centre four subcarriers all comprise DMRS. The UE has a bandwidth allocation corresponding to an even number of PRBs (4 in this example). The four bottom patterned subcarriers are outside the main reception bandwidth of the receive filter. Only PRBs of the UE are shown. DMRS for antenna ports {7, 8, 9, 10} are shown.

Figure 14:
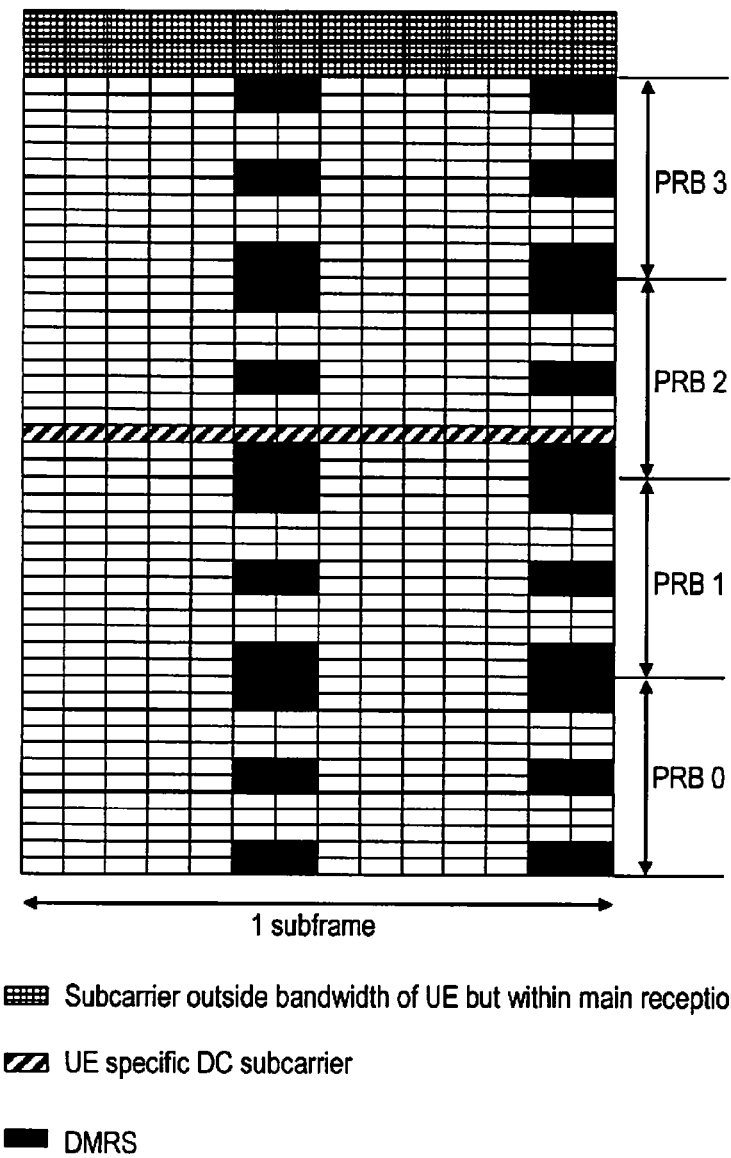
FIG. 14 illustrates yet an example of the position of the UE specific DC subcarrier within the bandwidth of the UE comprising an even number of PRBs.

FIG. 14 illustrates yet an example of the position of the UE specific DC subcarrier within the bandwidth of the UE comprising an even number of PRBs. The position of the UE specific DC subcarrier is the same as in FIG. 13, but instead of reducing the bandwidth at the lower edge of the UE bandwidth, the bandwidth is instead expanded at the upper edge of the UE bandwidth. In this manner, the UE receiver bandwidth is symmetric around the UE specific DC subcarrier. The expansion of the bandwidth is illustrated be the four patterned top subcarriers in FIG. 14. The UE has a bandwidth allocation corresponding to an even number of PRBs (4 in this example). All subcarriers allocated to the UE are received. Since the device receiver bandwidth is symmetric around the UE specific DC subcarrier, also the top four patterned subcarriers are within the main reception bandwidth of the UE, even though these subcarriers are probably intended for another UE. Only PRBs of the UE are shown. DMRS for antenna ports {7, 8, 9, 10} are shown.

In both FIG. 13 and FIG. 14, equally good locations of the UE specific DC subcarrier would be the subcarrier below the block of 4 DMRS, i.e. the four subcarriers in the centre of the "original" UE bandwidth before expanding or reducing the bandwidth. Which subcarrier should be the UE specific DC subcarrier (and thus the centre of the received bandwidth) is in one example hardcoded in the standard, based on a rule (e.g. depending on the PRB number), or could be signalled to the UE from the RBS.

FIGS. 13 and 14 illustrate extreme receiver bandwidth allocations in the sense that the main reception bandwidth is minimal as illustrated in FIG. 13 and maximal as illustrated in FIG. 14. Compromise allocations—e.g. FIG. 14 where the main reception bandwidth would exclude the lowest subcarrier and only include 3 extra subcarriers—are also possible.

In FIG. 13, the number of subcarriers outside the main reception bandwidth is rather large. If the RBS uses these subcarriers for data it could compensate the information loss in these subcarriers at the UE side via a more robust link adaption. Alternatively the RBS considers these subcarriers as empty during rate matching and does not use them for data transmission to the target UE.

Figure 15:
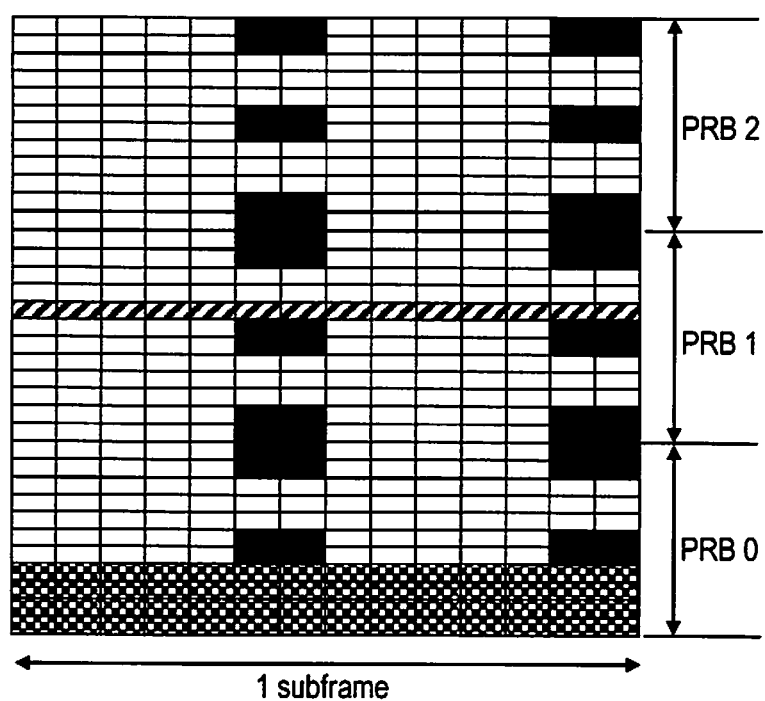
FIG. 15 illustrates an example of the position of the UE specific DC subcarrier within the bandwidth of the UE comprising an odd number of PRBs.
Figure 16:
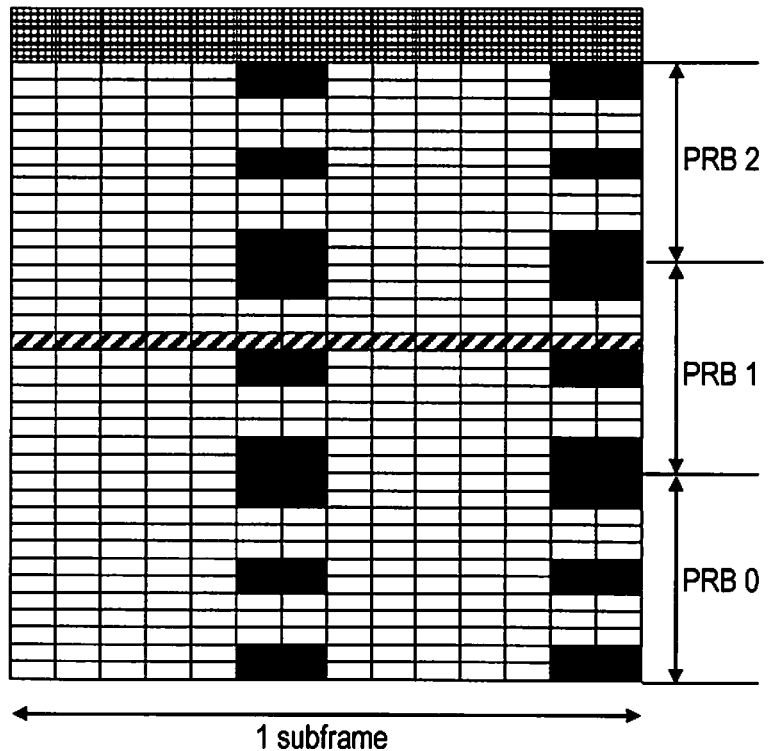
FIG. 16 illustrates another example of the position of the UE specific DC subcarrier within the bandwidth of the UE comprising an odd number of PRBs.

FIGS. 15 and 16 show a similar situation as in FIGS. 13 and 14, where the number of allocated PRB is odd. The same principles as outlined for FIGS. 13 and 14 also apply here.

Looking at FIGS. 15 and 16, they illustrate examples of the position of the UE specific DC subcarrier within the bandwidth of the UE comprising an odd number of PRBs.

The bandwidth of the UE corresponds to an odd number of PRBs (3 in these two examples). Since there is an even number of subcarriers (3*12=36) in the bandwidth, there is no single subcarrier that is the centre subcarrier, but two subcarriers are in the centre of the bandwidth of the UE. These two subcarriers are both a predetermined subcarrier since they both carry DMRS. Hence, the UE specific DC subcarrier may not coincide with any of these two centre subcarriers. Hence, the UE has to make sure that the UE specific DC subcarrier is positioned either above or beneath these two subcarriers. In the examples illustrated in FIGS. 15 and 16, the UE specific DC subcarrier is positioned above these two subcarriers. Then in order to achieve symmetry around the UE specific DC subcarrier, the bandwidth of the UE is in one example reduced as illustrated in FIG. 15 to exclude the three lowest subcarriers, i.e. lowest in frequency. In FIG. 16, in order to achieve symmetry around the UE specific DC subcarrier, the bandwidth of the UE is instead expanded to include three additional subcarriers at the upper part of the bandwidth of the UE. Only PRBs of the UE are shown. DMRS for antenna ports {7, 8, 9, 10} are shown.

Embodiments herein also relate to a UE supporting communication in a multicarrier radio communication system adapted for receiving information from an RBS. The UE has the same advantages, technical features and objects as the method in the UE, or performed by the UE. The UE will only be described in brief in order to avoid unnecessary repetition.

Figure 17:
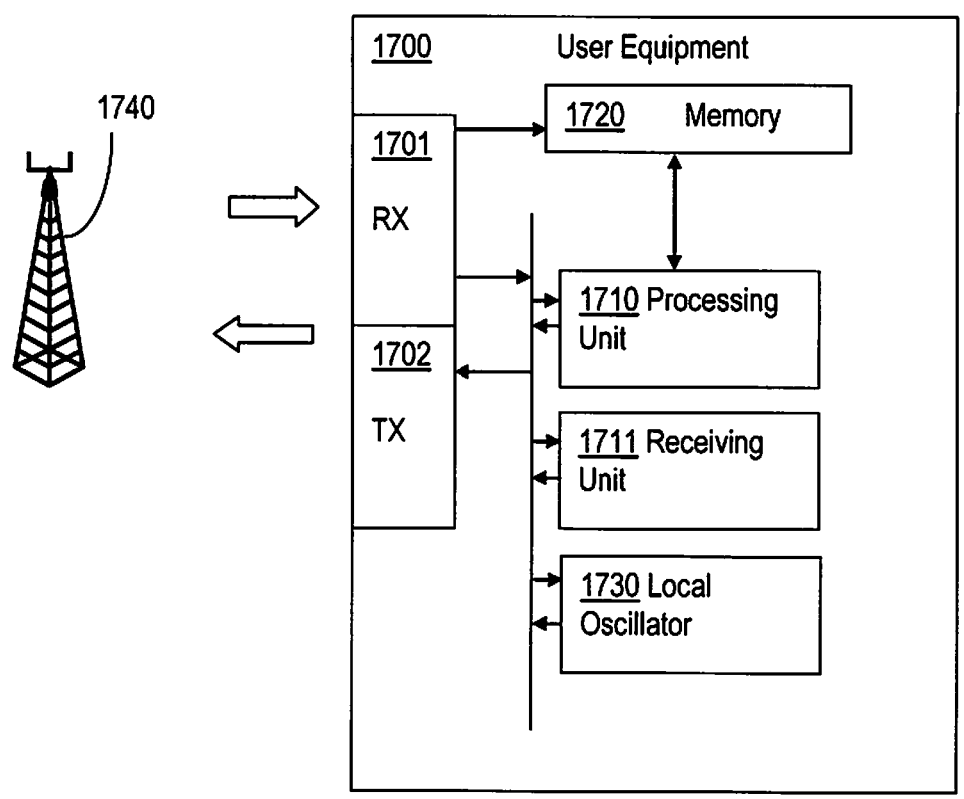
FIG. 17 is a block diagram of a UE adapted to receive information according to an exemplifying embodiment.

FIG. 17 is a block diagram of a UE 1700 adapted to receive information according to an exemplifying embodiment. FIG. 17 illustrates the UE comprising a processing unit 1710 adapted to determine a bandwidth by which the UE will receive information, the bandwidth comprising a plurality of subcarriers, and to adjust a bandwidth of the UE to correspond to the determined bandwidth by which the UE will receive information. FIG. 17 also illustrates the UE 1700 comprising a local oscillator 1730 adapted to locate/position the bandwidth of the UE with regards to frequency, wherein the processing unit 1710 further is adapted to tune the local oscillator such that a centre frequency of the local oscillator does not coincide with a predetermined subcarrier transmitted from the RBS.

The UE has several advantages. It is ensured that a UE camping outside the centre of a system bandwidth will not receive critical information located on a centre subcarrier which is affected by the local oscillator interference. A UE not monitoring the whole system bandwidth is enabled to camp on, or monitor, a sub-bandwidth of the system bandwidth located in frequency anywhere within the whole system bandwidth. It enables scheduling flexibility and the use of less expensive receiver circuitry since a local oscillator leakage need not be suppressed.

FIG. 17 is an exemplifying illustration of the UE 1700. The UE may comprise additional or other modules and/or units than illustrated in FIG. 17. FIG. 17 illustrates the UE further comprising a receiving unit 1701 and a transmitting unit 1702. These units may be one and the same or it may comprise several individual units or devices. For example, the two units 1701 and 1702 may comprise one or more antenna arrangements by means of which the UE communicates with e.g. a node, point or RBS.

According to an embodiment, the predefined subcarrier comprises a Demodulation Reference Signal, DMRS.

According to yet an embodiment, the predefined subcarrier comprises a Physical Downlink Shared Channel, PDSCH.

In still an embodiment, the UE further comprises a receiving unit 1711 adapted to receive bandwidth information from the RBS, wherein the processing unit 1710 is adapted to determine a bandwidth by which the UE will receive information based on the received bandwidth information.

In an embodiment, the processing unit 1710 is adapted to determine the bandwidth by which the UE will receive information by determining the number of subcarriers of the bandwidth and/or a location of the subcarriers with regard to frequency within a system bandwidth.

According to yet an embodiment, the processing unit 1710 is adapted to determine the bandwidth by which the UE will receive information by determining the number of subcarriers of the bandwidth and/or a location of the subcarriers with regard to frequency within a system bandwidth.

According to still an embodiment, the processing unit 1710 further is adapted to determine which subcarrier is the predetermined subcarrier based on information available to the UE.

In an embodiment, the processing unit 1710 further is adapted to determine if the centre frequency of the local oscillator 1730 coincides with the predetermined subcarrier. If this is the case, the processing unit 1710 is adapted to select at least one filter parameter to expand the bandwidth of the UE to include at least a portion of at least one additional subcarrier, and adapted to tune the local oscillator 1730 to shift the centre frequency of the oscillator towards and edge of the bandwidth in order for the centre frequency of the oscillator not coinciding with the predetermined subcarrier.

In still an embodiment, the processing unit 1710 further is adapted to determine if the centre frequency of the local oscillator 1730 coincides with the predetermined subcarrier. If this is the case, the processing unit 1710 is adapted to select at least one filter parameter to reduce the bandwidth of the UE to exclude at least a portion of at least one subcarrier, and adopted to tune the local oscillator 1730 to shift the centre frequency of the oscillator towards an edge of the bandwidth in order for the centre frequency of the oscillator not coinciding with the predetermined subcarrier.

According to an embodiment, the multicarrier radio communication system is an Orthogonal Frequency Division Multiplex, OFDM, based system.

In FIG. 17, the UE is also illustrated comprising a receiving unit 1701 and a transmitting unit 1702. Through these two units, the UE is adapted to communicate with other nodes and/or entities in the wireless communication network. The receiving unit 1701 may comprise more than one receiving arrangement. For example, the receiving unit may be connected to an antenna, by means of which the UE is enabled to communicate with other nodes and/or entities in the wireless communication network. Similarly, the transmitting unit 412 may comprise more than one transmitting arrangement, which in turn are connected an antenna, by means of which the UE is enabled to communicate with other nodes and/or entities in the wireless communication network. The UE further comprises a memory 1720 for storing data. Further, the UE is illustrated comprising a processing unit 1710 which in turns may comprise different modules. It shall be pointed out that this is merely an illustrative example and the UE may comprise more, less or other units which execute the functions of the UE in the same manner as the units illustrated in FIG. 17.

It should be noted that FIG. 17 merely illustrates various functional units in the UE in a logical sense. The functions in practice may be implemented using any suitable software and hardware means/circuits etc. Thus, the embodiments are generally not limited to the shown structures of the UE and the functional units. Hence, the previously described exemplary embodiments may be realised in many ways. For example, one embodiment includes a computer-readable medium having instructions stored thereon that are executable by the processing unit for executing the method steps in the UE. The instructions executable by the computing system and stored on the computer-readable medium perform the method steps of the present invention as set forth in the claims.

FIG. 17 schematically shows an embodiment of a UE 1700. Comprised in the UE 1700 are here a processing unit 1710, e.g. with a DSP (Digital Signal Processor). The processing unit 1710 may be a single unit or a plurality of units to perform different actions of procedures described herein. The UE 1710 may also comprise an input unit for receiving signals from other entities, and an output unit for providing signal(s) to other entities. The input unit and the output unit may be arranged as an integrated entity or as one or more interfaces.

Furthermore, the UE 1700 comprises at least one computer program product in the form of a non-volatile memory, e.g. an EEPROM (Electrically Erasable Programmable Read-Only Memory), a flash memory and a hard drive. The computer program product comprises a computer program, which comprises code means, which when executed in the processing unit 1710 in the UE 1700 causes the UE 1700 to perform the actions e.g. of the procedure described earlier in conjunction with FIG. 3.

The computer program may be configured as a computer program code structured in computer program modules. Hence, in an exemplifying embodiment, the code means in the computer program of the UE 1700 comprises a determining module for determining a bandwidth by which the UE will receive information, the bandwidth comprising a plurality of subcarriers. The computer program further comprises an adjusting module for adjusting a bandwidth of the UE to correspond to the determined bandwidth by which the UE will receive information. Still further, the computer program comprises a tuning module for fine tuning a local oscillator of the UE such that a centre frequency of a local oscillator does not coincide with a predetermined subcarrier transmitted from the RBS.

The computer program modules could essentially perform the actions of the flow illustrated in FIG. 3, to emulate the UE 1700. In other words, when the different computer program modules are executed in the processing unit 1710, they may correspond to the modules described above.

Although the code means in the embodiment disclosed above in conjunction with FIGS. 3 and 17 are implemented as computer program modules which when executed in the processing unit causes the UE 1700 to perform the actions described above in the conjunction with figures mentioned above, at least one of the code means may in alternative embodiments be implemented at least partly as hardware circuits.

The processor may be a single CPU (Central processing unit), but could also comprise two or more processing units. For example, the processor may include general purpose microprocessors; instruction set processors and/or related chips sets and/or special purpose microprocessors such as ASICs (Application Specific Integrated Circuit). The processor may also comprise board memory for caching purposes. The computer program may be carried by a computer program product connected to the processor. The computer program product may comprise a computer readable medium on which the computer program is stored. For example, the computer program product may be a flash memory, a RAM (Random-access memory) ROM (Read-Only Memory) or an EEPROM, and the computer program modules described above could in alternative embodiments be distributed on different computer program products in the form of memories within the UE 1700.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method in a User Equipment, UE, supporting communication in a multicarrier radio communication system for receiving information from a Radio Base Station, RBS, the method comprising:
   determining a bandwidth by which the UE will receive information, the bandwidth comprising a plurality of subcarriers,
   adjusting a bandwidth of the UE to correspond to the determined bandwidth by which the UE will receive information, and
   fine tuning a local oscillator of the UE such that a centre frequency of the local oscillator does not coincide with a predetermined subcarrier transmitted from the RBS, wherein if the centre frequency of the local oscillator coincides with the predetermined subcarrier, then the method comprises selecting at least one filter parameter to expand the bandwidth of the UE to include at least a portion of at least one additional subcarrier and tuning the local oscillator to shift the centre frequency of the local oscillator towards an edge of the bandwidth of the UE in order for the centre frequency of the local oscillator to not coincide with the predetermined subcarrier.

2. A method according to claim 1, wherein the predetermined subcarrier comprises a Demodulation Reference Signal, DMRS.

3. A method according to claim 1, wherein the predetermined subcarrier comprises a Physical Downlink Shared Channel, PDSCH.

4. A method according to claim 1, wherein determining the bandwidth by which the UE will receive information comprises receiving information from the RBS indicating the bandwidth.

5. A method according to claim 1, wherein determining the bandwidth by which the UE will receive information comprises determining a number of subcarriers of the bandwidth and/or a location of the subcarriers with regard to frequency within a system bandwidth.

6. A method according to claim 1, wherein information indicating which subcarrier is the predetermined subcarrier is signalled from the RBS.

7. A method according to claim 1, wherein information indicating which subcarrier is the predetermined subcarrier is determined by the UE.

8. A method according to claim 1, wherein if the centre frequency of the local oscillator coincides with the predetermined subcarrier, then the method comprises selecting the at least one filter parameter to reduce the bandwidth of the UE to exclude the at least a portion of the at least one subcarrier and tuning the local oscillator to shift the centre frequency of the local oscillator towards the edge of the bandwidth of the UE in order for the centre frequency of the local oscillator to not coincide with the predetermined subcarrier.

9. A method according to claim 1, wherein the multicarrier radio communication system is an Orthogonal Frequency Division Multiplex, OFDM, based system.

10. A User Equipment, UE, supporting communication in a multicarrier radio communication system adapted for receiving information from a Radio Base Station, RBS, the UE comprising a processing unit adapted to:
 determine a bandwidth by which the UE will receive information, the bandwidth comprising a plurality of subcarriers, and
 adjust a bandwidth of the UE to correspond to the determined bandwidth by which the UE will receive information,
 the UE further comprising a local oscillator adapted to position the bandwidth of the UE with regards to frequency, wherein the processing unit further is adapted to tune the local oscillator such that a centre frequency of the local oscillator does not coincide with a predetermined subcarrier transmitted from the RBS, wherein the processing unit further is adapted to determine if the centre frequency of the local oscillator coincides with the predetermined subcarrier, and if so, the processing unit is adapted to select at least one filter parameter to reduce the bandwidth of the UE to exclude at least a portion of at least one subcarrier, and adapted to tune the local oscillator to shift the centre frequency of the local oscillator towards an edge of the bandwidth of the UE in order for the centre frequency of the local oscillator to not coincide with the predetermined subcarrier.

11. A UE according to claim 10, wherein the predetermined subcarrier comprises a Demodulation Reference Signal, DMRS.

12. A UE according to claim 10, wherein the predetermined subcarrier comprises a Physical Downlink Shared Channel, PDSCH.

13. A UE according to claim 10, further comprising a receiving unit adapted to receive bandwidth information from the RBS, wherein the processing unit is adapted to determine the bandwidth by which the UE will receive information based on the received bandwidth information.

14. A UE according to claim 10, wherein the processing unit is adapted to determine the bandwidth by which the UE will receive information by determining a number of subcarriers of the bandwidth and/or a location of the subcarriers with regard to the frequency within a system bandwidth.

15. A UE according to claim 10, further comprising a receiving unit adapted to receive a signalling message from the RBS, the signalling message comprising information indicating which subcarrier is the predetermined subcarrier.

16. A UE according to claim 10, wherein the processing unit further is adapted to determine which subcarrier is the predetermined subcarrier based on information available to the UE.

17. A UE according to claim 10, wherein the processing unit further is adapted to determine if the centre frequency of the local oscillator coincides with the predetermined subcarrier, and if so, the processing unit is adapted to select the at least one filter parameter to expand the bandwidth of the UE to include the at least a portion of the at least one additional subcarrier, and adapted to tune the local oscillator to shift the centre frequency of the local oscillator towards the edge of the bandwidth of the UE in order for the centre frequency of the local oscillator to not coincide with the predetermined subcarrier.

18. A UE according to claim 10, wherein the multicarrier radio communication system is an Orthogonal Frequency Division Multiplex, OFDM, based system.

* * * * *